United States Patent
Payne et al.

(10) Patent No.: US 12,056,236 B2
(45) Date of Patent: Aug. 6, 2024

(54) DEFENDING AGAINST ADVERSARIAL QUERIES IN A DATA GOVERNANCE SYSTEM

(71) Applicant: International Business Machines Corporation, Armonk, NY (US)

(72) Inventors: Joshua F. Payne, San Antonio, TX (US); Ashish Kundu, Elmsford, NY (US); Arjun Natarajan, Old Tappan, NJ (US); Roger C. Raphael, San Jose, CA (US); Scott Schumacher, Porter Ranch, CA (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 17/210,838

(22) Filed: Mar. 24, 2021

(65) Prior Publication Data
US 2022/0309155 A1 Sep. 29, 2022

(51) Int. Cl.
*G06F 21/55* (2013.01)
*G06F 16/901* (2019.01)
*G06N 3/04* (2023.01)
*G06N 3/0442* (2023.01)
*G06N 3/0464* (2023.01)
*G06N 3/0475* (2023.01)
*G06N 3/08* (2023.01)
(Continued)

(52) U.S. Cl.
CPC ........ *G06F 21/554* (2013.01); *G06F 16/9024* (2019.01); *G06N 3/04* (2013.01); *G06N 3/08* (2013.01); *G06F 2221/034* (2013.01)

(58) Field of Classification Search
CPC .. G06F 21/554; G06F 21/552; G06F 16/9024; G06F 2221/034; G06F 2221/2141; G06N 3/04; G06N 3/08; G06N 3/0475; G06N 3/088; G06N 3/0442; G06N 3/0464; G06N 3/09
See application file for complete search history.

(56) References Cited

U.S. PATENT DOCUMENTS 6,466,695 B1 * 10/2002 Potzsch ................ G06V 10/449
382/199
6,928,554 B2 8/2005 Dettinger
(Continued)

FOREIGN PATENT DOCUMENTS

| CN | 111931173 A | 11/2020 |
| CN | 112001415 A | 11/2020 |

OTHER PUBLICATIONS

Predicting Behavioral Patterns in Discussion Forums using Deep Learning on Hypergraphs, by Arya et al., published 2019 (Year: 2019).*

(Continued)

*Primary Examiner* — Vu V Tran
(74) *Attorney, Agent, or Firm* — Daniel M. Yeates

(57) ABSTRACT

An apparatus and related method defend against adversarial queries. A policy enforcement hypergraph is constructed to express a set of security policies. Then, the hypergraph is repeatedly traversed to determine whether a user behavior is changing over time. The user behavior is measured by reference to a vertex or an edge in the hypergraph. If it is determined that the user behavior has changed over time an enforcement action is taken based on a security policy.

20 Claims, 13 Drawing Sheets

(51) Int. Cl.
  *G06N 3/088* (2023.01)
  *G06N 3/09* (2023.01)

(56) References Cited

U.S. PATENT DOCUMENTS

| | | | |
|---|---|---|---|
| 7,752,215 B2 | 7/2010 | Dettinger | |
| 8,321,387 B2 | 11/2012 | Dettinger | |
| 10,331,644 B2 | 6/2019 | Smart | |
| 10,733,292 B2 | 8/2020 | Araujo | |
| 10,825,227 B2 | 11/2020 | Amer | |
| 10,855,706 B2 | 12/2020 | Choudhury | |
| 11,714,992 B1* | 8/2023 | Heaton | G06F 9/4881 706/15 |
| 2008/0161941 A1 | 7/2008 | Strassner | |
| 2010/0268722 A1* | 10/2010 | Yalamanchi | G06F 16/9024 707/E17.014 |
| 2012/0137367 A1* | 5/2012 | Dupont | G06F 21/00 726/25 |
| 2014/0359695 A1 | 12/2014 | Chari | |
| 2016/0006730 A1 | 1/2016 | Chari | |
| 2017/0161624 A1* | 6/2017 | Porter | G06N 5/04 |
| 2017/0293666 A1* | 10/2017 | Ragavan | G06F 16/9024 |
| 2018/0212996 A1* | 7/2018 | Nedeltchev | H04L 67/12 |
| 2019/0258953 A1 | 8/2019 | Ulrich | |
| 2019/0278760 A1* | 9/2019 | Smart | G06F 16/25 |
| 2019/0325343 A1* | 10/2019 | Feng | G06F 17/16 |
| 2020/0012540 A1 | 1/2020 | Walters | |
| 2020/0128047 A1* | 4/2020 | Biswas | H04L 63/1425 |
| 2021/0067549 A1 | 3/2021 | Chen | |
| 2021/0125005 A1 | 4/2021 | Kuta | |
| 2021/0182394 A1 | 6/2021 | Condessa | |
| 2022/0156393 A1 | 5/2022 | Butcher | |
| 2022/0166795 A1 | 5/2022 | Simioni | |
| 2022/0179882 A1* | 6/2022 | Cervantes | G06N 5/025 |
| 2022/0191206 A1 | 6/2022 | Cook | |
| 2022/0309179 A1 | 9/2022 | Payne | |

OTHER PUBLICATIONS

A. Al-Shomrani, F. Fathy and K. Jambi, "Policy enforcement for big data security," 2017 2nd International Conference on Anti-Cyber Crimes (ICACC), Abha, Saudi Arabia, 2017, pp. 70-74, doi: 10.1109/Anti-Cybercrime.2017.7905266, https://ieeexplore.ieee.org/document/7905266.
Aditya Grover and Jure Leskovec, node2vec: Scalable Feature Learning for Networks, 2016, https://arxiv.org/pdf/1607.00653.pdf.
Applying Machine Learning Techniques To Determine Product Risks, IPCOM000256883D, Jan. 7, 2019, https://priorart.ip.com/IPCOM/000256883.
Ashish Kundu, et al., "Resource Access Policy Enforcement Using a Hypergraph," U.S. Appl. No. 16/830,019, filed Mar. 25, 2020.
Austin Sharp et al., "JanusGraph," printed Mar. 15, 2021, pp. 1-5, https://www.janusgraph.org.
Bose, AJ. et al.; Generalizable Adversarial Attacks Using Generative Models, May 26, 2019, https://arxiv.org/pdf/1905.10864v1.pdf.
Cynthia Dwork and Aaron Roth, "Algorithmic Foundations of Differential Privacy". https://www.cis.upenn.edu/~aaroth/Papers/privacybook.pdf.
Dengyong Zhou et al, Learning with Hypergraphs: Clustering, Classification, and Embedding—http://papers.nips.cc/paper/3128-learning-with-hypergraphs-clustering-classification-and-embedding.pdf.
Extracting Point of Interest Information From Query Logs, IPCOM000252095D, https://priorart.ip.com/IPCOM/000252095.
Haochen Chen et al., HARP: Hierarchical Representation Learning for Networks—https://arxiv.org/abs/1706.07845.
Hierarchical Cybersecurity & Privacy Governance, Risk & Compliance (HCP-GRC) Schema, IPCOM000262399D, Published May 27, 2020, https://priorart.ip.com/IPCOM/000262399.
Hogan, A. et al.; Knowledge Graphs, https://arxiv.org/abs/2003.02320.
Hongwei Wang et al., "GraphGAN: Graph Representation Learning with Generative Adversarial Nets"—https://arxiv.org/pdf/1711.08267.pdf.
Hybrid Workloads for Healthcare Data Processing, IPCOM000262024D, Published Apr. 26, 2020, https://priorart.ip.com/IPCOM/000262024.
Ian J. Goodfellow et al., "Generative Adversarial Networks"—https://arxiv.org/pdf/1406.2661.pdf.
IBM Cloud Security Advisor, https://www.ibm.com/cloud/security-advisor, printed Mar. 22, 2021.
IBM Watson Knowledge Catalog (WKC). https://dataplatform.cloud.IBM.com/docs/content/wsj/catalog/overview-wkc.html.
Interface Security and Compliance Properties of Software Systems With Graph, PCOM000258717D, Published Jun. 8, 2019, https://priorart.ip.com/IPCOM/000258717.
Jordanov B. (2010) HyperGraphDB: A Generalized Graph Database. In: Shen H.T. et al. (eds) Web-Age Information Management. WAIM 2010. Lecture Notes in Computer Science, vol. 6185. Springer, Berlin, Heidelberg. https://doi.org/10.1007/978-3-642-16720-1_3.
James A. Hoagland et al., "A Graph-based Language for Specifying Security Policies".https://pdfs.semanticscholar.org/7fc4/3f49abf2071af5daecd23a7f68884a8c41e2.pdf.
Jonas Mueller and Aditya Thyagarajan, "Siamese Recurrent Architectures for Learning Sentence Similarity". https://www.aaai.org/ocs/index.php/AAAI/AAAI16/paper/download/12195/12023.
Joshua F. Payne et al, "Defending Against Adversarial Queries in a Data Governance System," U.S. Appl. No. 17/210,866, filed Mar. 24, 2021.
Joshua F. Payne, Training a Neural Network to Create an Embedding for an Unlabeled Vertex in a Hypergraph, U.S. Appl. No. 16/792,277, filed Feb. 16, 2020.
Kos, J. et al.; Adversarial Examples for Generative Models, https://arxiv.org/abs/1702.06832.
List of IBM Patents or Patent Applications Treated as Related.
Liu, X. et al.; Rob-Gan: Generator, Discriminator, and Adversarial Attacker, 2018, https://arxiv.org/abs/1807.10454.
Muzammil Baig et al., "Data Privacy against Composition Attack". https://link.springer.com/chapter/10.1007/978-3-642-29038-1_24.
Naoise Holohan, "Mathematical Foundations of Differential Privacy". https://www.scss.tcd.ie/Doug.Leith/pubs/Naoise_thesis.pdf, 52.
Pasquini, D. et al.; Adversarial Out-Domain Examples for Generative Models, 2019, https://arxiv.org/abs/1903.02926.
Perozzi et al, DeepWalk: Online Learning of Social Representations, Jun. 27, 2014, 10 pages, https://arxiv.org/pdf/1403.6652.pdf.
Prioritizing Testcases and Anomalies in Prod Using Execution Behavior Model Characteristics Mined From System Logs, IPCOM000254585D, Jul. 13, 2018, https:/priorart.ip.com/IPCOM/000254585.
Qiongkai Xu et al, Attentive Graph-based Recursive Neural Network for Collective Vertex Classification—http://users.cecs.anu.edu.au/~u5170295/papers/cikm-xu-2017.pdf.
Quanyu Dai et al., "Adversarial Network Embedding"—https://www.aaai.org/ocs/index.php/AAAI/AAAI18/paper/viewFile/16498/15927.
R. Helms and K. Buijsrogge, "Knowledge Network Analysis: A Technique to Analyze Knowledge Management Bottlenecks in Organizations," 16th International Workshop on Database and Expert Systems Applications (DEXA'05), Copenhagen, Denmark, 2005, pp. 410-414, doi: 10.1109/DEXA.2005.127.
Rossi, RA. et al.; Deep Feature Learning for Graphs, 2017, https://arxiv.org/abs/1704.08829.
Scarselli et al, The Graph Neural Network Model, IEEE Transactions On Neural Networks, vol. 20, No. 1, Jan. 2009, https://ieeexplore.ieee.org/document/4700287/.
Srivatsava Ganta et al., "Composition Attacks and Auxiliary Information in Data Privacy". https://arxiv.org/pdf/0803.0032.pdf.
System and Method for Cognitive Microservices Recommendations, IPCOM000264284D, Published Nov. 30, 2020, https://priorart.ip.com/IPCOM/000264284.

(56) References Cited

OTHER PUBLICATIONS

Thomas Kipf and Max Welling, "Semi-Supervised Classification with Graph Convolutional Networks". https://arxiv.org/pdf/1609.02907.pdf.

Uthsav Chitra, Benjamin J Raphael, "Random Walks on Hypergraphs with Edge-Dependent Vertex Weights". https://arxiv.org/pdf/1905.08287.pdf.

Wei Jiang and Chris Clifton, "A secure distributed framework for achieving k-anonymity". https://dl.acm.org/citation.cfm?id=1152719.

William Hamilton et al, Inductive Representation Learning on Large Graphs (GraphSAGE): https://arxiv.org/pdf/1706.02216.pdf.

Yifan Feng, Haoxuan You, Zizhao Zhang, Rongrong Ji, Yue Gao, "Hypergraph Neural Networks". http://gaoyue.org/paper/HGNN.pdf.

International Search Report and Written Opinion dated Apr. 28, 2022 from International Application No. PCT/ CN2022/076192 filed Feb. 14, 2022.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

DEFENDING AGAINST ADVERSARIAL QUERIES IN A DATA GOVERNANCE SYSTEM

BACKGROUND

The present disclosure relates to machine learning, and more specifically, to robust inference and adversarial machine learning.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of these capabilities is the database. Databases generally refer to a number of different types of computerized information storage and retrieval systems. The most prevalent type of database is the relational database, which in turn, generally refers to a tabular formatted database that stores and defines data such that it can be reorganized and accessed in a number of different ways. A relational database management system (RDBMS) is a computer database management system (DBMS) that uses relational techniques for storing and retrieving data.

Regardless of the particular architecture of the database, in a DBMS, a requesting entity (e.g., an application or the operating system) demands access to a specified database by issuing a database access request. In relational databases, such requests may include, for example, simple catalog lookup requests or transactions and combinations of transactions that operate to read, change, and add specified records in the database. These requests may be made using a high-level query language, such as the Structured Query Language (SQL). The term "query," in turn, generally denominates a set of commands for retrieving data from a stored database. Queries may take the form of a SQL command that lets programs select, insert, update, find out the location of data, and so forth.

SUMMARY

According to embodiments of the present disclosure, a method is provided for defending against adversarial queries. The method comprises constructing a policy enforcement hypergraph to express a set of security policies. The method further comprises repeatedly traversing the hypergraph to determine whether a user behavior is changing over time. The user behavior is measured by reference to a vertex or an edge in the hypergraph. The method further determines that the user behavior has changed over time based on the traversing of the hypergraph, and, in response, takes an enforcement action based on a security policy.

Advantageously, this approach provides an adaptable defense against queries that may result in disclosing unintended and secure information, and is responsive to user behavior.

According to embodiments of the present disclosure, the hypergraph expresses assets, users, and security policies as vertices and correlations, and contexts and events as edges. Advantageously, many tools developed for analyzing hypergraphs may be applied to the problem of defending against adversarial queries.

According to embodiments of the present disclosure, the hypergraph comprises vertices and edges, and the method further comprises training a machine learning model to determine changes of the vertices and edges over time. Advantageously, this approach allows the model to be adaptable over time and in response to changing conditions.

According to embodiments of the present disclosure, the method uses sequence models for time series data to evaluate a behavior of the vertices and edges over time. Advantageously, this allows the tools available for sequence models to be applied to the problem of defending against adversarial queries.

According to embodiments of the present disclosure, the method comprises receiving a series of queries to a system, analyzing the series of queries to identify changes of respective hypergraph vertices and edges over time, in response to the analyzing, generating a suspicion score, comparing the suspicion score to a predetermined robustness criteria, and taking the enforcement action in response to the comparing. Advantageously, use of a suspicion score allows a quantitative metric to be used for the analysis.

According to embodiments of the present disclosure, the method further comprises receiving an adjustment to the robustness criteria. Advantageously, this allows the system to be adapted based on received information.

According to embodiments of the present disclosure, the enforcement action comprises revoking access privileges. Advantageously, this allows the system to take actions that help to protect the system from attacks.

According to embodiments of the present disclosure, the construction of the policy enforcement hypergraph may utilize one of a graph convolutional neural network and a hypergraph random walk model. Advantageously, use of a graph convolutional neural network allows the system to learn in response to different forms of threats that the system may encounter.

According to embodiments of the present disclosure, the method may further comprise performing one-shot learning to embed vertices in graphs to estimate similarity between sets of vertices in the hypergraph. Advantageously, this may help to develop and/or evolve a model more rapidly.

According to embodiments of the present disclosure, the method may further comprise repeatedly traversing the hypergraph by a long short-term memory (LSTM) model. Advantageously, this allows available LSTM tools to be applied to the hypergraph.

According to embodiments of the present disclosure, the hypergraph comprises edges that are used to define which policies apply which to users and assets in which contexts. Advantageously, this allows applying known hypergraph techniques to determinations involving users and assets in particular assets.

Embodiments of this disclosure also include an apparatus comprising memory and a processor that is configured to perform the method steps described above. Similarly, a computer readable media may comprise instructions that direct a processor to perform the method steps described above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
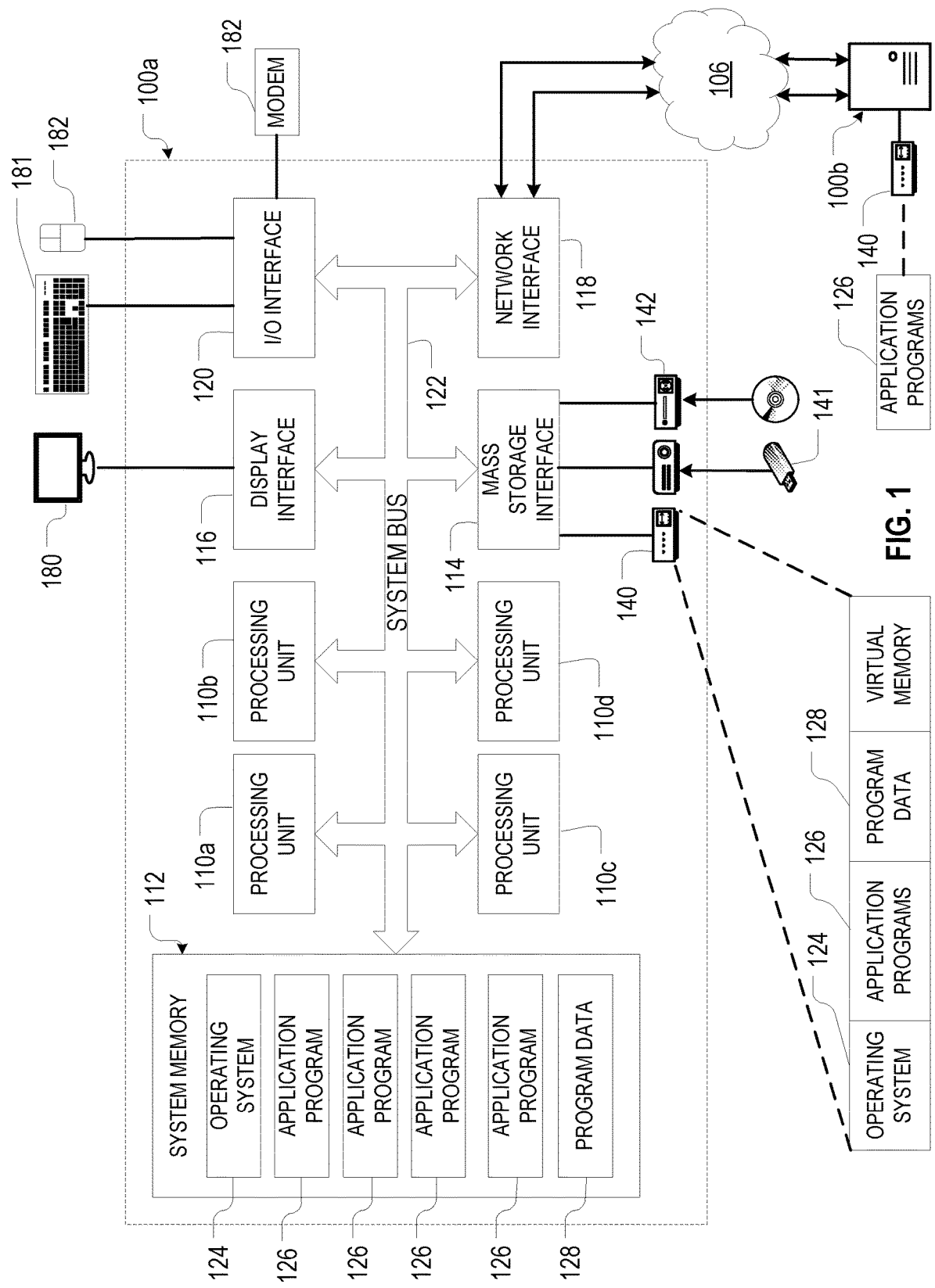
FIG. 1 is a pictorial block diagram that illustrates an embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to machine learning; more particular aspects relate to robust inference and adversarial machine learning. While the present disclosure is not necessarily limited to such applications, various aspects of the disclosure may be appreciated through a discussion of various examples using this context.

Databases often contain confidential or otherwise sensitive material that require a degree of security to be protected from access, e.g., medical records. As a result, most DBMS include functionality to protect the security and privacy of that material. One possible approach for protecting this material is to restrict access to selected users. To this end, a DBMS may implement user profiles that specify a level of authority. Whether or not a particular user (or program) may access some particular data will depend upon that user's level of authority, typically specified in their respective user profile.

The foregoing approach, however, may be both inflexible and static, yet still open to exploits. For example, consider a medical database in which the only results a certain class of users are permitted to see are the patients' clinic numbers, e.g., in order to ensure the anonymity of patients having sensitive health information in the database. Despite these rules, an adversarial user (e.g., someone deliberately trying to circumvent those protections) may still be able to determine the identity of patients with a fair degree of certainty by issuing a series of carefully crafted queries, perhaps coupled with information otherwise known to the user. Such a process is referred to herein as query union analysis. The following is an illustrative series of queries designed to identify a particular individual according to a clinic number (which, in this example, is an identifier uniquely identifying an individual) and a number of unique patient records that each query returns:

TABLE 1

Example Queries

| Query No. | Query Subj. | Query Results |
|---|---|---|
| Query 1 | People diagnosed with Alzheimer's in 1998 | 1200 |
| Query 2 | People married and living in California | 6000 |
| Query 3 | People living between the ages of 70 and 80 | 14,000 |
| Query 4 | People with clinic visits in 1999 and 2001, but not in any other years | 6000 |

Taken independently, each of the foregoing queries returns a reasonable number of results to protect individuals' privacy. Collectively, however, the number of results that satisfy all of the conditions may be significantly smaller, perhaps even as small as one person. That is, taken together, a series of apparently safe queries may allow the adversarial user to learn a particular patient's clinic number. Thereafter, having determined a clinic number for one individual, that adversarial user may run other queries, e.g., any query that returns clinic number along with other information, to obtain sensitive information about that particular patient.

Looking forward, the adversarial user may use deep learning to automatically generate the series of queries, thereby permitting them to probe for vulnerabilities in the DBMS that will allow access to one or more data assets in a manner that should not be allowed by the DBMS. One example scenario would be for an adversary to specify a target (set of entries, access rights, etc.) and slightly modify the parameters of the query to take advantage of gaps in rule-based or score-based policies.

Rule-based and score-based policies strict enough to prevent this and other forms of attack, however, may prevent legitimate users (e.g., medical researchers) from accessing the broad range of data necessary for their projects. As a result, the effectiveness of that database for legitimate purposes may be limited. Accordingly, one feature and advantage of some embodiments of this disclosure is that they can provide a balance of data accessibility and security.

Accordingly, one beneficial feature of some embodiments is an enforcement graph and/or hypergraph system robust to these attacks. Some embodiments may also include the use of generative adversarial models and other deep learning methods to provide richer inferences relating to the similarity of objects, scores based on provenance and user behavior, etc. Additionally, some embodiments may allow for a near-optimal distribution of data assets in an ecosystem with respect to latency, risk, frequency of access, and other measures.

Data Processing System

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a USB drive 141, and/or a readable/writable optical disk drive 142. The network interfaces 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard 181, mouse 182, modem 183, or printer (not shown)

The terminal/display interface 116 may be used to directly connect one or more displays 180 to the data processing system 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
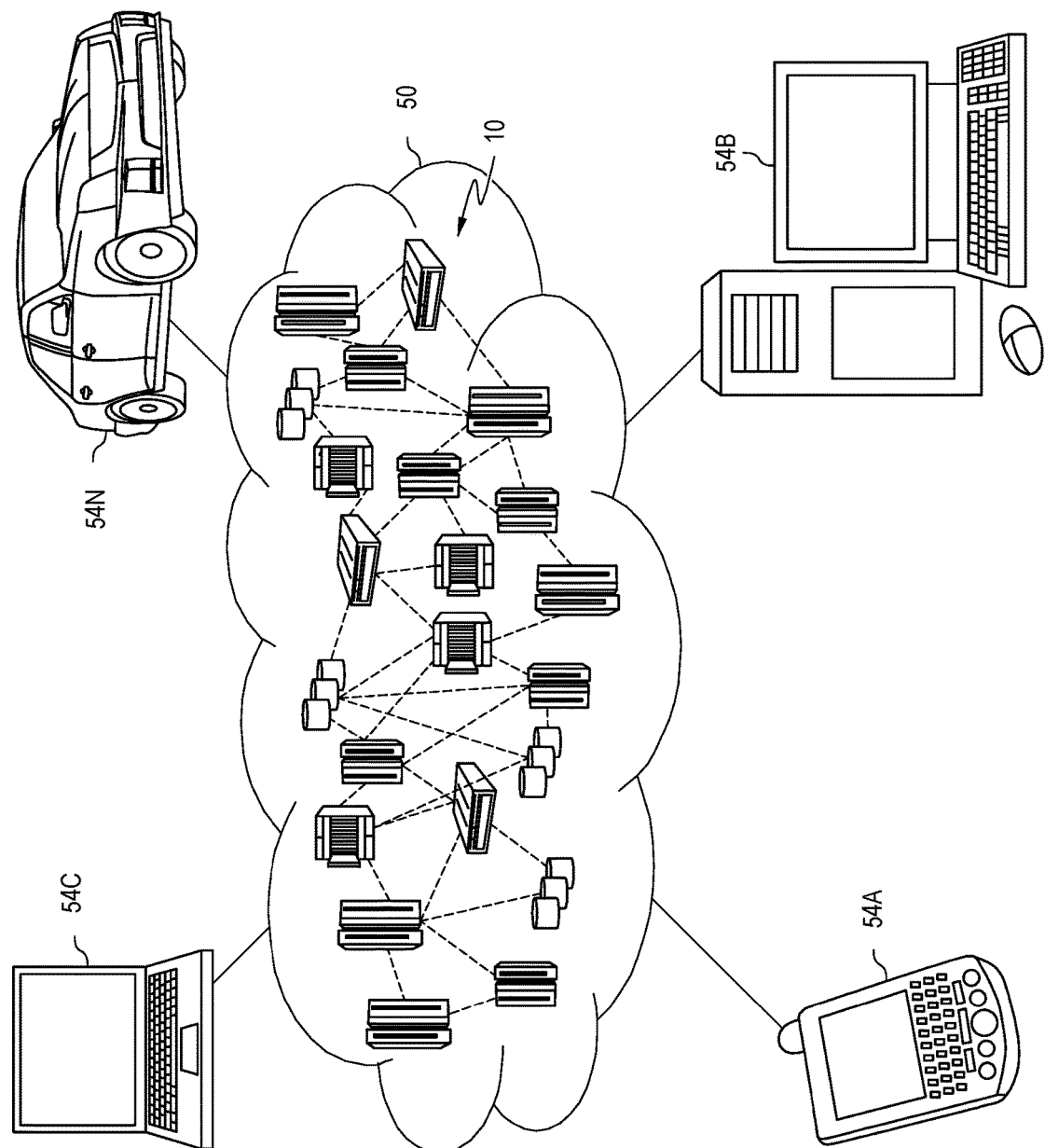
FIG. 2 is a pictorial diagram that depicts a cloud computing environment, consistent with some embodiments.

FIG. 2 illustrates one embodiment of a cloud environment suitable for an edge enabled scalable and dynamic transfer learning mechanism. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
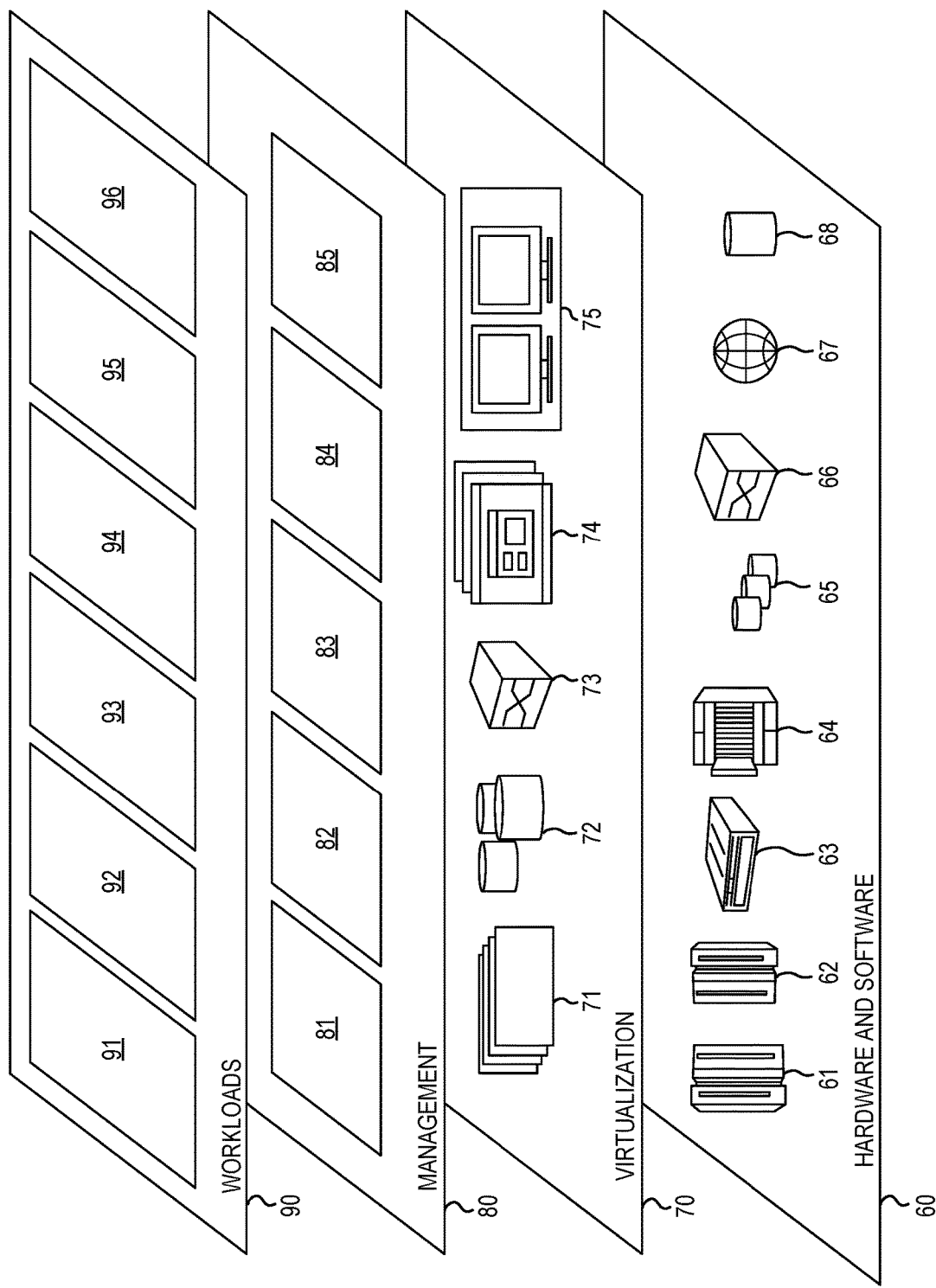
FIG. 3 is a pictorial diagram that depicts abstraction model layers, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application software 96.

Machine Learning

The machine learning module 96, in some embodiments, may implement machine learning models ("ML models"). The ML models, in turn, may be any software system that recognizes patterns. In some embodiments, the ML models comprise a plurality of artificial neurons interconnected through connection points called synapses or gates. Each synapse encodes a strength of the connection between the output of one neuron and the input of another. The output of each neuron, in turn, is determined by the aggregate input received from other neurons that are connected to it, and thus by the outputs of these "upstream" connected neurons and the strength of the connections as determined by the synaptic weights.

The ML models may be trained to solve a specific problem (e.g., speech recognition, query generation, database security, etc.) by adjusting the weights of the synapses such that a particular class of inputs produces a desired output. This weight adjustment procedure in these embodiments is known as "training" or "learning." Ideally, these adjustments lead to a pattern of synaptic weights that, during the learning process, converge toward an optimal solution for the given problem based on some cost function. In some embodiments, the artificial neurons may be organized into layers.

Figure 4A:
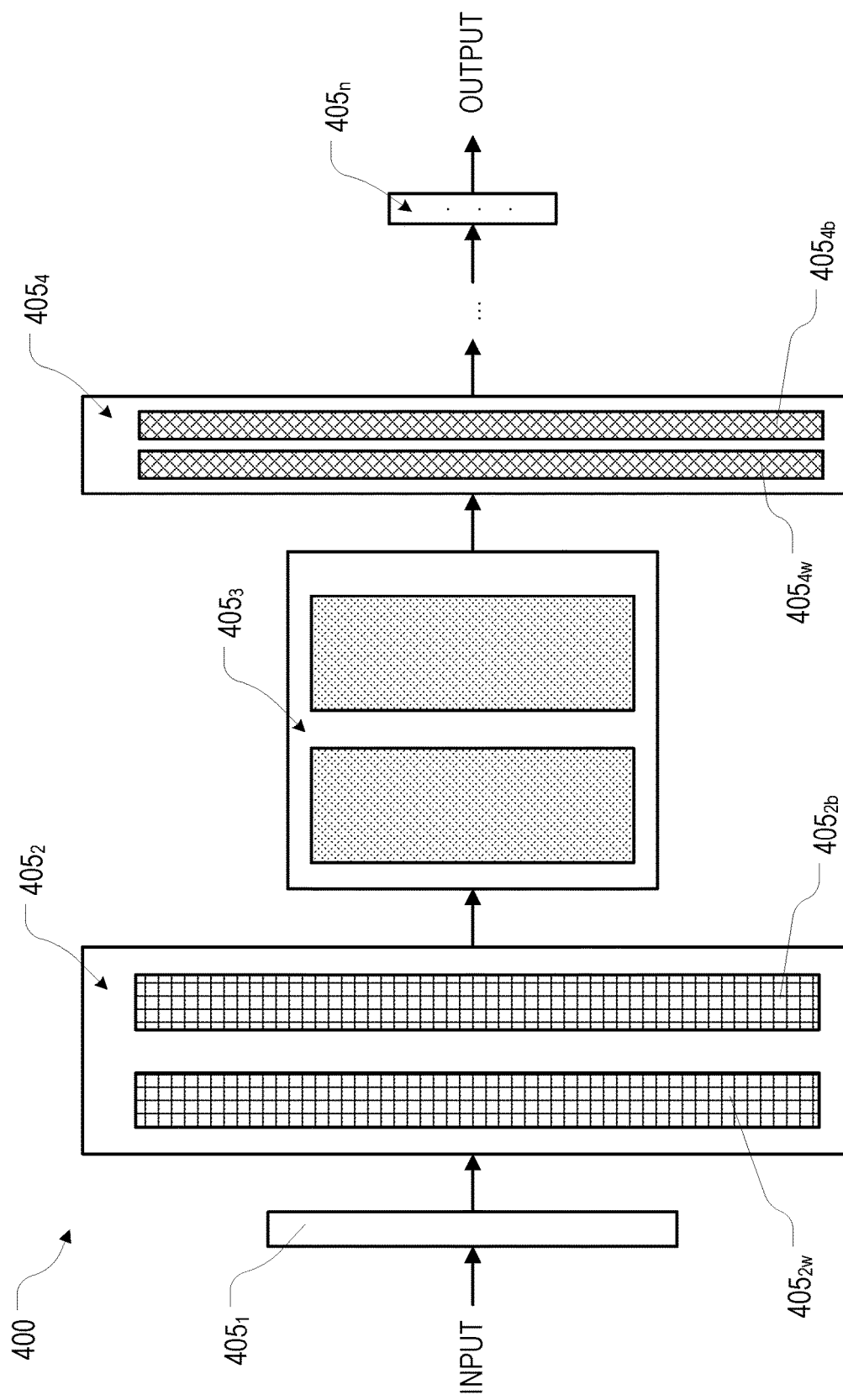
FIG. 4A is a block diagram that illustrates an example ML model, consistent with some embodiments.

FIG. 4A illustrates an example ML model 400 for deep learning, consistent with some embodiments and which may be implemented as at least a part of the application software 96. The ML model 400 comprises a plurality of layers 4051-405$n$. Each of the layers comprises weights 4051$w$-405$nw$ and biases 4051$b$-405$nb$ (only some labeled for clarity). The layer 4051 that receives external data is the input layer. The layer 405$n$ that produces the ultimate result is the output layer. Some embodiments include a plurality of hidden layers 4052-405$n$-1 between the input and output layers and commonly hundreds of such hidden layers. Some of the hidden layers 4052-405$n$-1 may have different sizes, organizations, and purposes than other hidden layers 4052-405$n$-1. For example, some of the hidden layers in the ML model may be convolution layers, while other hidden layers may be fully connected layers, deconvolution layers, or recurrent layers.

Figure 4B:
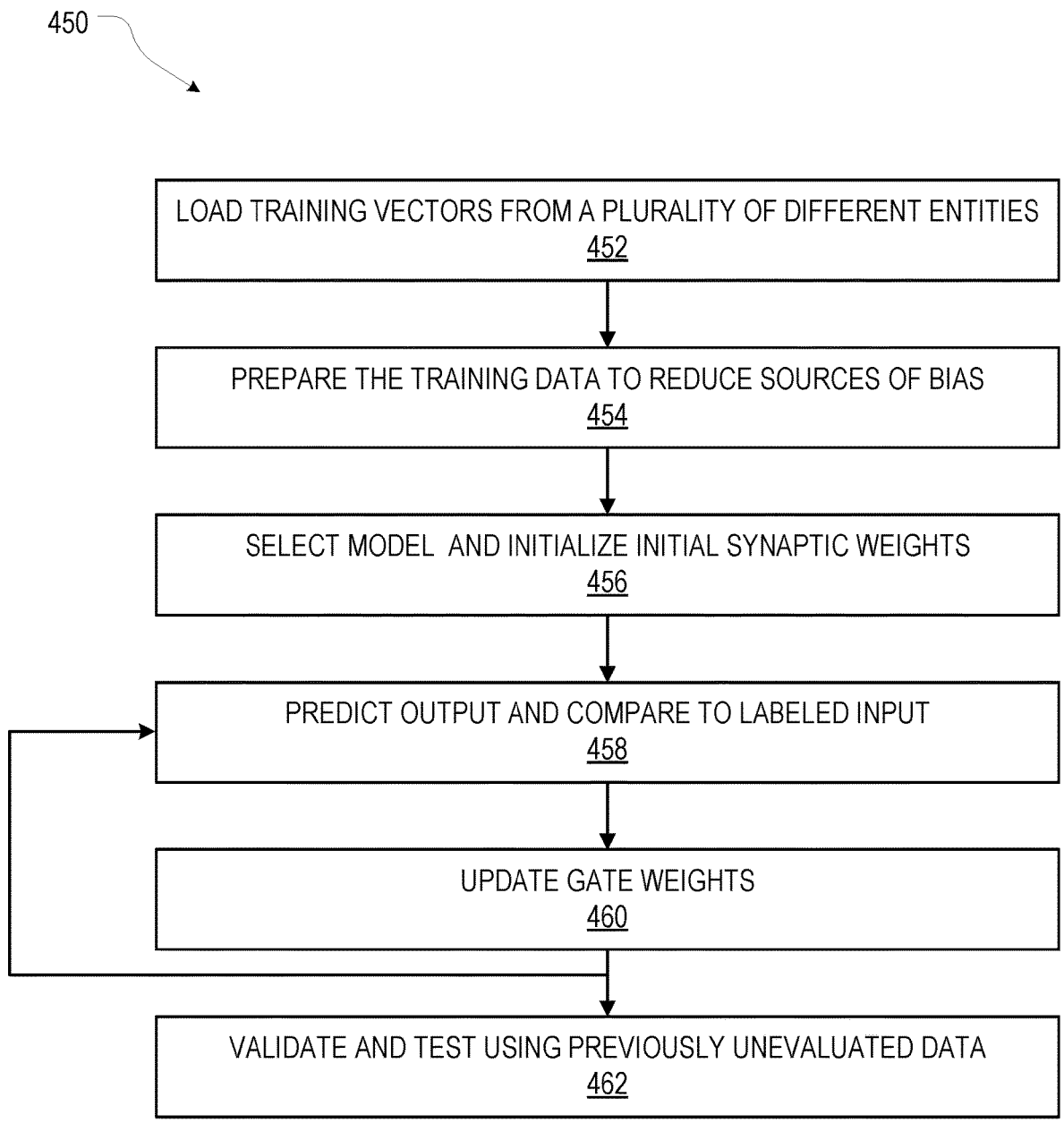
FIG. 4B is a flowchart that depicts one embodiment of a ML model training method, consistent with some embodiments.

Referring now to FIG. 4B, one embodiment of a ML model training method 450 is depicted, described with reference to speech recognition as an illustrative example and consistent with some embodiments. At operation 452, the system may receive, and then load, training data. In this example, the input data-set may include a series of example queries sent to a database system. At operation 454, the training data is prepared to reduce sources of bias, typically including de-duplication, normalization, and order randomization. At operation 456, a model is selected for training, and the initial synaptic weights are initialized (e.g., randomized). Depending on the underlying task, suitable models include, but are not limited to, feedforward techniques (e.g., convolutional neural networks), regulatory feedback-based systems, radial basis function (RBF) techniques, and recurrent neural network-based techniques (e.g., long short-term memory (LSTM)). At operation 458, the selected model is used to predict an output using the input data element, and that prediction is compared to the corresponding target data. A gradient (e.g., difference between the predicted value and the target value) may then be used at operation 460 to update the synaptic weights in some embodiments. This process may repeat, with each iteration updating the weights, until the training data is exhausted, or the model reaches an acceptable level of accuracy and/or precision. At operation 462, the resulting model may optionally be compared to previously unevaluated data to validate and test its performance.

Aspects of some embodiments of this disclosure may utilize reinforcement learning and/or evolutionary strategy training techniques instead of the gradient-based system described above. These techniques may be desirable for use in the Generative Adversarial Models (GANs) described below because the discriminator and generator portions need not be trained with sample data. Rather, the ML models in the GAN may learn through trial and error. For example, a sequence of successful decisions may result in the process being reinforced, because one of the two ML models in the GAN successfully solved the problem at hand.

Enforcement Graphs

A graph generally refers to a data structure comprising nodes (or vertices) and edges (or lines or arcs) that connect any two nodes in the graph. An enforcement graph generally refers to a graph that is used to enforce data policies. Enforcement graphs may be used in some embodiments to provide graph traversal-based policy enforcement; similarity measurement between entities, policies, or assets; and vertex correlation.

Figure 5:
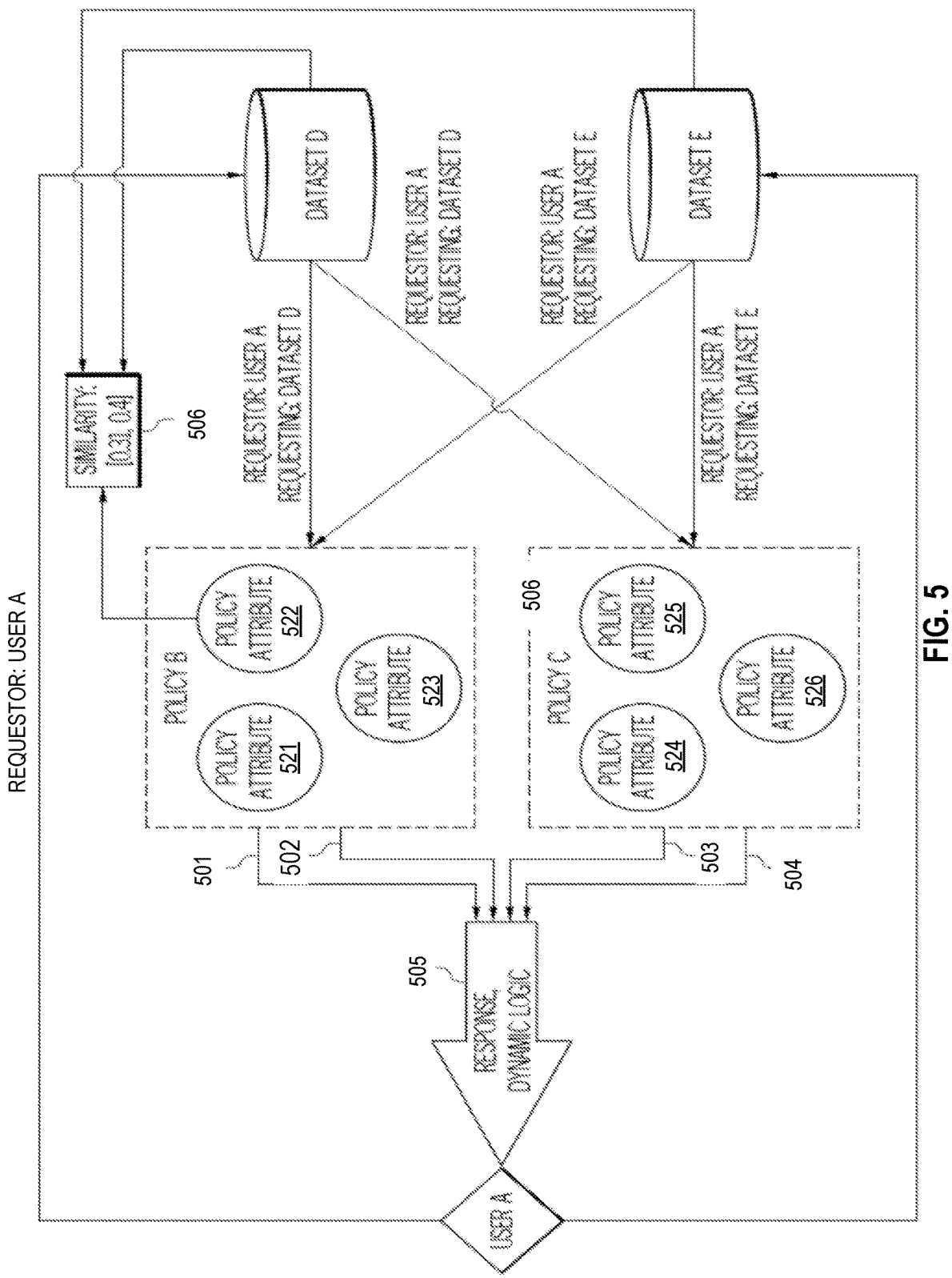
FIG. 5 is a block diagram that presents an example policy enforcement graph, consistent with some embodiments.

With reference now to FIG. 5, an example policy enforcement graph 500 is presented consistent with some embodiments. A policy enforcement graph 500 in this example may be a graph that is used to enforce data policies. Vertices types in policy enforcement graph 500 may include: users/requestors (e.g., User A); assets (e.g., datasets, databases, hardware), such as dataset D and dataset E; policies (e.g., policy B and policy C, which may respectively have policy attributes 521-523 and policy attributes 524-526, which may describe what types of systems and/or users are authorized to utilize resources such as dataset D and/or dataset E, governance entities, abstract data types, policies on where data can be stored, policies on where data of a certain type are allowed to be stored, etc.

Edge types between vertices may depend on a source vertex (e.g., User A) and a target vertex (e.g., dataset D). Example edges (depicted as arrows in FIG. 2) within policy enforcement graph 500 include a request for an asset, as described by the edge/arrow from User A and dataset D and/or dataset E). That is, an edge can demonstrate an action in some embodiments.

Other edges within the policy enforcement graph 500 may represent an evaluation of an asset (e.g., dataset D) with respect to a policy describing which user the policy applies to, whether that user is allowed to use that asset, etc. For example, some edges may describe how assets are to be used for certain entities (systems and/or users). Other edges may describe the information needed in a response (using dynamic logic) to User A, as depicted as response 505.

For example, edge 501 includes the following information for resource requestor User A: Requested resource: Dataset D; Policy Attributes: policy attribute 521, policy attribute 523. Edge 502 may include the following information for resource requestor User A: Requested resource: Dataset D; Policy Attributes: policy attribute 522. Edge 503 may include the following information for resource requestor User A: Requested resource: Dataset D; Policy Attributes: policy attribute 25, policy attribute 526. Edge 504 may include the following information for resource requestor User A: Requested resource: Dataset E; Policy Attributes: policy attribute 24, policy attribute 25, and policy attribute 26.

In this way, the edges 501-504 in this illustrative example may describe policy information about dataset D and/or dataset E that relate to User A. As such, edges, such as edges 501-504, may describe which user is allowed to access and/or transform a particular asset (resource); which asset is being requested by a particular user; which policy(s) apply to a particular user and/or asset; and which rules (i.e., part of a policy) apply to a particular asset.

Similarity vector 506 may describe how well certain resources comport with particular policy attributes. For example, similarity vector 506 may show that dataset D has a 31% (0.31) conformance with policy attribute 522, and that dataset E has a 40% (0.40) conformance with policy attribute 522. As such, dataset E may be better suited (based on policy B) to respond to User A's response for data in this example.

While policy enforcement graph 500 may provide the information needed to determine whether a particular asset is available to User A based on relevant policies, the information may be difficult to utilize when deciding whether to allow User A to access dataset D or dataset E. That is, the information shown in FIG. 5 is essentially tabular, and thus, it may be difficult to understand how different datasets interact with different policies and their attributes, and whether or not particular users are allowed to access these different datasets based on the different policies and their attributes.

As such, some embodiments may extend policy enforcement graph 500 into a policy enforcement hypergraph. A data policy enforcement hypergraph, in turn, generally refers to a combinatorial object that is more general and expressive than a simple graph by using hyperedges that may express the applications of policies to particular resources and for particular requesters. The hypergraph may provide a hierarchical expression of policies as hypervertices (induced sub-hypergraphs) that allow for efficient knowledge representation. Such hypervertices may be easily modified and vertices within hyperedges become collapsible/morphable prior to queries according to policy enforcement graph protocol.

A hyperedge consistent with some embodiments may define sets of vertices, which may contain X users and Y data assets, and may show that the X users have access to the Y assets. Some embodiments may allow for inference on hyperedges to reason about which users may have access to which assets, as well as which policies apply. Suitable inference methods may include, without limitation, hypergraph Laplacian analysis, random walks, and hypergraph convolutions.

Figure 6:
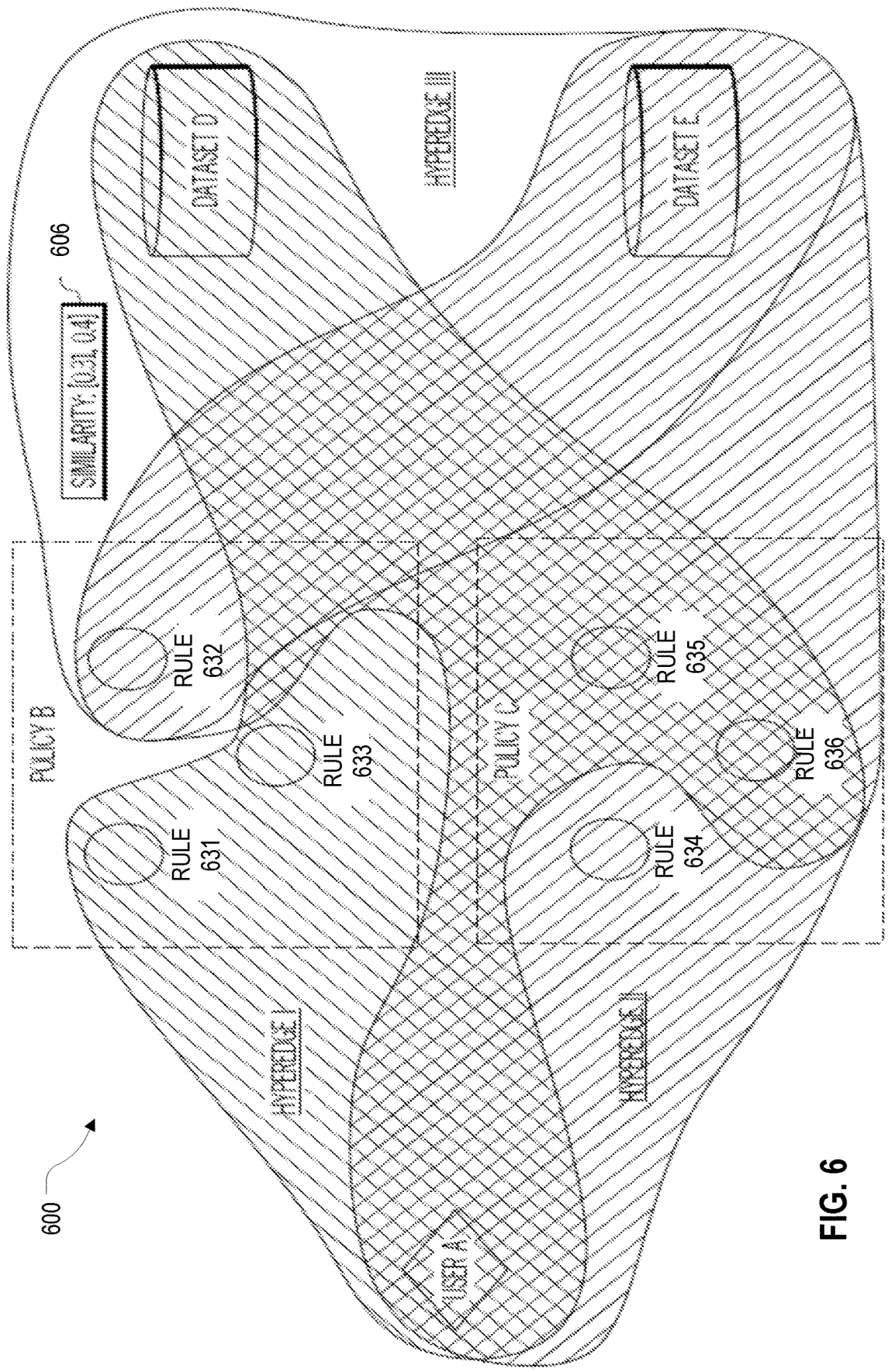
FIG. 6 is a pictorial diagram that presents an example policy enforcement hypergraph, consistent with some embodiments.

With reference now to FIG. 6, an example policy enforcement hypergraph 600 is presented, consistent with some embodiments. As shown in FIG. 6, the policy enforcement hypergraph 600 may include the User A, policy B, policy C, dataset D, dataset E, and similarity vector 506 found in policy enforcement graph 500 shown in FIG. 5. Furthermore, policy enforcement hypergraph 600 may include rule 631, rule 632, rule 633, rule 634, rule 635, and rule 636, which respectively may be components of the policy attribute 521, policy attribute 522, policy attribute 523, policy attribute 524, policy attribute 525, and policy attribute 526 shown in FIG. 5. Thus, for example, a policy may describe various features of a particular asset/resource, or which a rule may be one of such features. In addition, the policy enforcement hypergraph 600 may include hyperedges I-III, which may provide a new ability for enforcing policies regarding access to certain resources, such as datasets.

One beneficial feature of some policy enforcement hypergraph 600 embodiments includes the power of hyperedge I, hyperedge II, and hyperedge III when traversing through policy enforcement hypergraph 600 to identify policies for certain resources (e.g., dataset D) when evaluating resources, as applied to certain users/systems (e.g., User A). For example, rather than walking/traversing through the various vertices and edges shown in policy enforcement graph 500, which may require heavy processing resources to interpret the vertices and edges for the policies that they represent when User A attempts to access certain resources, walking/traversing through hyperedges (e.g., hyperedge I, hyperedge II, and/or hyperedge III) in the policy enforcement hypergraph 600 may allow the data system to quickly and efficiently evaluate policies related to the User A who is trying to access these resources.

More specifically, in the example in FIG. 6, traversing through hyperedges in the policy enforcement hypergraph 600 may enable the system to quickly apply certain policy rules to certain resources for certain users. In FIG. 6, assume for purposes of illustration that hyperedge I is defined for User A, policy rule 631, policy rule 633, policy rule 635, policy rule 636, and dataset D. Assume further that hyperedge II is defined for User A, policy rule 632, policy C, and dataset E. Assume further that hyperedge III is defined for dataset D, dataset E, policy rule 632, and similarity vector 606 ([0.31, 0.4]).

As such, if a system (e.g., Deep Neural Network—DNN) is trained to identify policies to be used for User A, it may be able to quickly recognize hyperedge I and hyperedge II as being relevant. More specifically, in this example, if User A is requesting data from dataset D, then hyperedge I may be the only relevant hyperedge, because it is the only hyperedge relevant to User A and dataset D.

Accordingly, one beneficial feature of some policy enforcement hypergraph embodiments is that they may enable the system to conduct a graph traversal-based, path-based policy enforcement that uses similarity measurements between entities (e.g., users), policies, and assets (e.g., resources such as the datasets shown in FIG. 6) by traversing through a particular hyperedge within the policy enforcement hypergraph 600. Another beneficial feature of some policy enforcement hypergraph embodiments is they may enable a policy application analysis (suggesting a change of scope, addition/deletion of policies). Thus, in some embodiments, a policy enforcement graph (e.g., a data policy enforcement graph) is to be represented as a data policy enforcement hypergraph, which is a combinatorial object that is more general and expressive than a simple graph, by using hyperedges that express the applications of policies to particular resources and for particular requesters. This hypergraph provides a hierarchical expression of policies as hypervertices (induced sub-hypergraphs) that allows for efficient knowledge representation. Such hypervertices are easily modified, and vertices within hyperedges become collapsible/morphable prior to queries according to policy enforcement graph protocol.

In an embodiment, the traversal through the policy enforcement hypergraph 600 and the decisions that are developed therefrom are performed in a rule-based manner. That is, rules define which pathways are to be taken through policy enforcement hypergraph 600 according to what resources are being requested, a profile of the requesting entity, etc. These rules are then used to guide a user and/or train a neural network to determine whether or not to authorize a requester access to a requested resource, as described herein.

Figure 7:
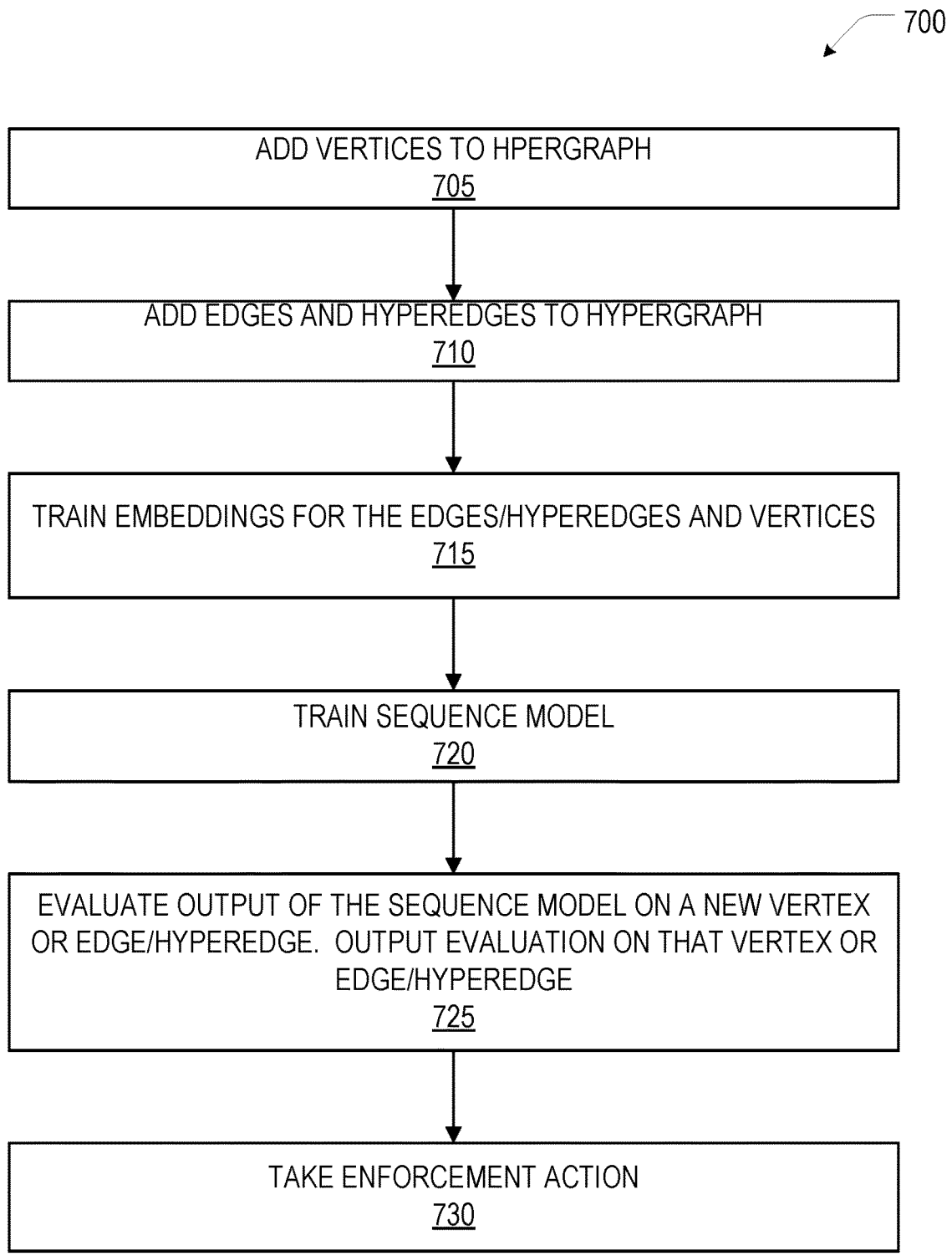
FIG. 7 is a flow chart illustrating one method of creating an enforcement graph, consistent with some embodiments.

FIG. 7 is a flow chart illustrating one method 700 of creating an enforcement graph, consistent with some embodiments. At operation 705, vertices may be added as an asset, user, rule, policy, or other abstract data types. At operation 710, edges and hyperedges may be added as correlations, contexts, or events to these vertices to construct an enforcement graph and/or an enforcement hypergraph. Next, at operation 715, embeddings for the edges/hyperedges and vertices may be trained using the techniques discussed in more detail with respect to FIGS. 5-6.

Next, at operation 720, a sequence ML model, such as a long short-term memory (LSTM), transformer model, may be trained using supervised or semi-supervised learning on a labeled set of embeddings and embedding sequences. The LSTM model, in turn, may comprise a plurality of artificial cells interconnected through connection points called gates. Each cell in some embodiments may comprise an input gate, an output gate, and a forget gate. The cells may be interconnected such that the output gate of one cell is the input gate of another cell.

The cells in some LSTM embodiments may remember their values over the arbitrary time intervals, and the gates may be the sub-entity that regulates the flow of information into and out of the cell. Each gate in the LSTM model may further encode a strength of a relationship in the connection between the output of one cell and the input of another cell. The output of each cell, in turn, may be determined by the aggregate input(s) received from other cells that are connected to it via gates, and thus by the outputs of these "upstream" connected cells and the strength of the connections as determined by numeric weights on the gates. In this way, embodiments using LSTM models may be desirable because the LSTM model can remember values over arbitrary time intervals. This, in turn, may allow for classifying events in input time series data for particular entities. However, other types of ML models are consistent with the disclosure.

Referring again to FIG. 7, the output of the selected sequence model may be evaluated on a new vertex or edge/hyperedge to receive an evaluation on that vertex or edge/hyperedge at operation 725. Optionally, an existing access control system may be used to help determine the output. In some embodiments, the output/result of the existing access control system may be weighed by a predetermined factor in any decision made by the disclosed hypergraph ML decision model.

As will be discussed in more detail below, in some embodiments, the existing access control system may create/designate an access control rule based on an inference generated by an adversarial ML model (e.g., if the suspicion inferred by the adversarial ML model surpasses a predetermined criterion, then deny access to that user).

At operation 730, appropriate enforcement action (e.g., revoke certain access privileges) may be taken in response to the output of the selected ML model.

Inference Vulnerability

Inference vulnerabilities generally refer to vulnerabilities in which an adversary uses one or more users to access one or more independent data assets to breach privacy using an inference not available in any strict subset of the data assets. Inference vulnerabilities may yield perfect breaches (where the adversary can deduce the exact sensitive information) or partial breaches (where the adversary can boil the possible sensitive values to a few values). One feature and advantage of some embodiments is the ability to identify inference vulnerabilities by evaluating the similarities and relationships within groups of users and within groups of data assets, as well as between them. In particular, users may exhibit illicit or suspicious access behaviors over time, possibly indicating account compromise or fraud.

Figure 8:
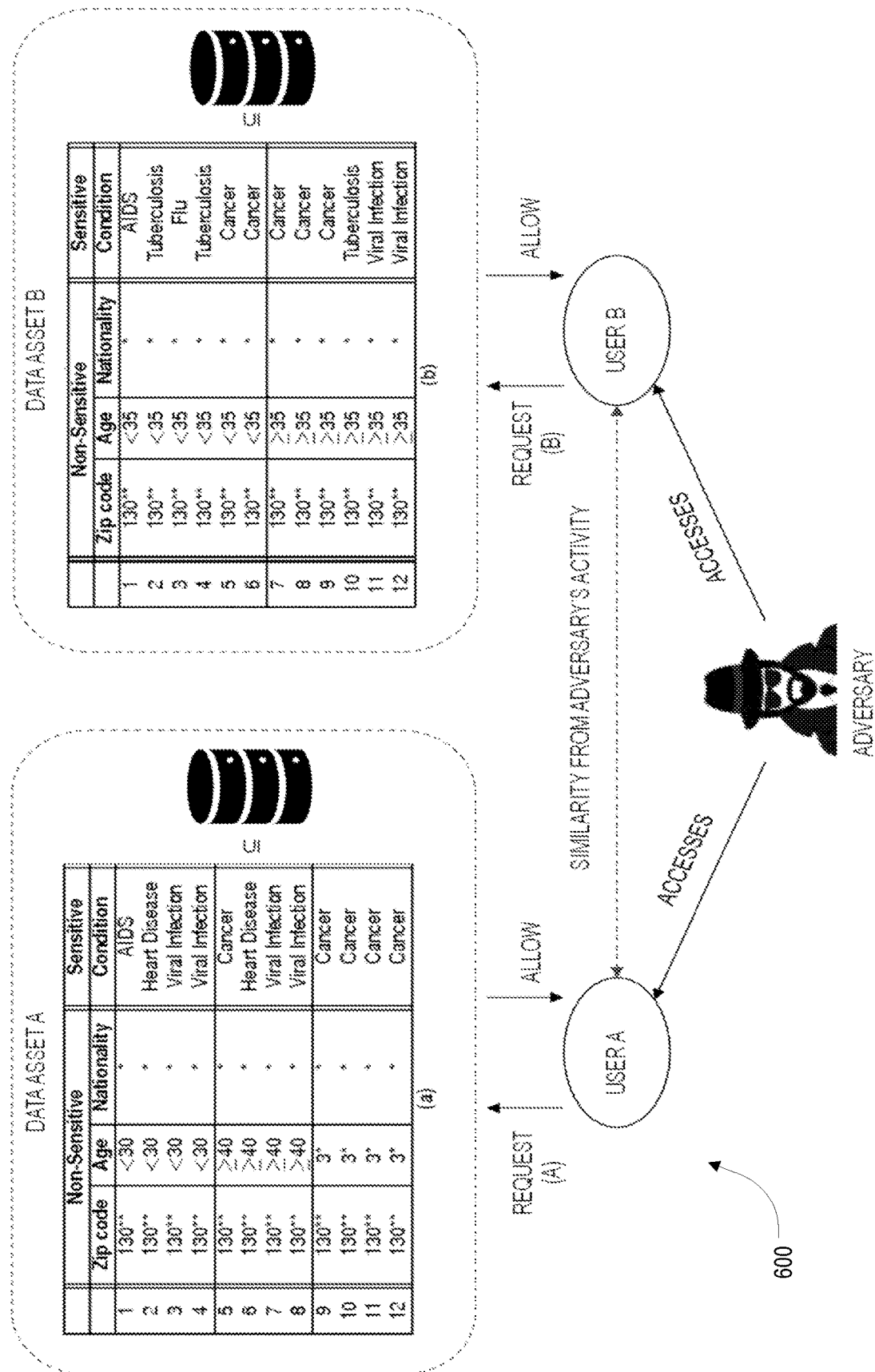
FIG. 8 is a pictorial diagram that depicts an illustrative application of an enforcement hypergraph in a data ecosystem comprising two data assets and two users, consistent with some embodiments.

FIG. 8 depicts an illustrative application 800 of an enforcement hypergraph in a data ecosystem comprising two data assets and two users, consistent with some embodiments. The data assets in this example are Data Asset A and Data Asset B, corresponding to a database for hospital A and a database for hospital B, respectively. Both data assets in this illustrative example are anonymized by the decade of birth and zip code, pursuant to best practices.

The users are User A and User B in this example. However, they are both accessed/controlled by an adversarial user. In this illustrative example, User A requests and receives the twelve entries shown from Data Asset A, and User B requests and receives the twelve entries shown from Data Asset B. The adversary now has all of this information and can use it to infer protected information, e.g., if the adversarial user knows that Patient P is <30 years old, lives in ZIP code 130**, and has visited both of these hospitals, it can now infer that Individual C has AIDS.

While rule-based systems may provide detection of some attacks, suspicious behavior is a time-based access behavior that resembles other behaviors over time may also lead to data breaches. For example, users that are part of an inference attack may have similar activity, and thus may be correlated by a similarity metric. As will be discussed in more detail below, this correlation may allow some embodiments to determine that for two users and data assets in this example, application 800 may form a hyperedge that may be labeled as inference-vulnerable.

Figure 9:
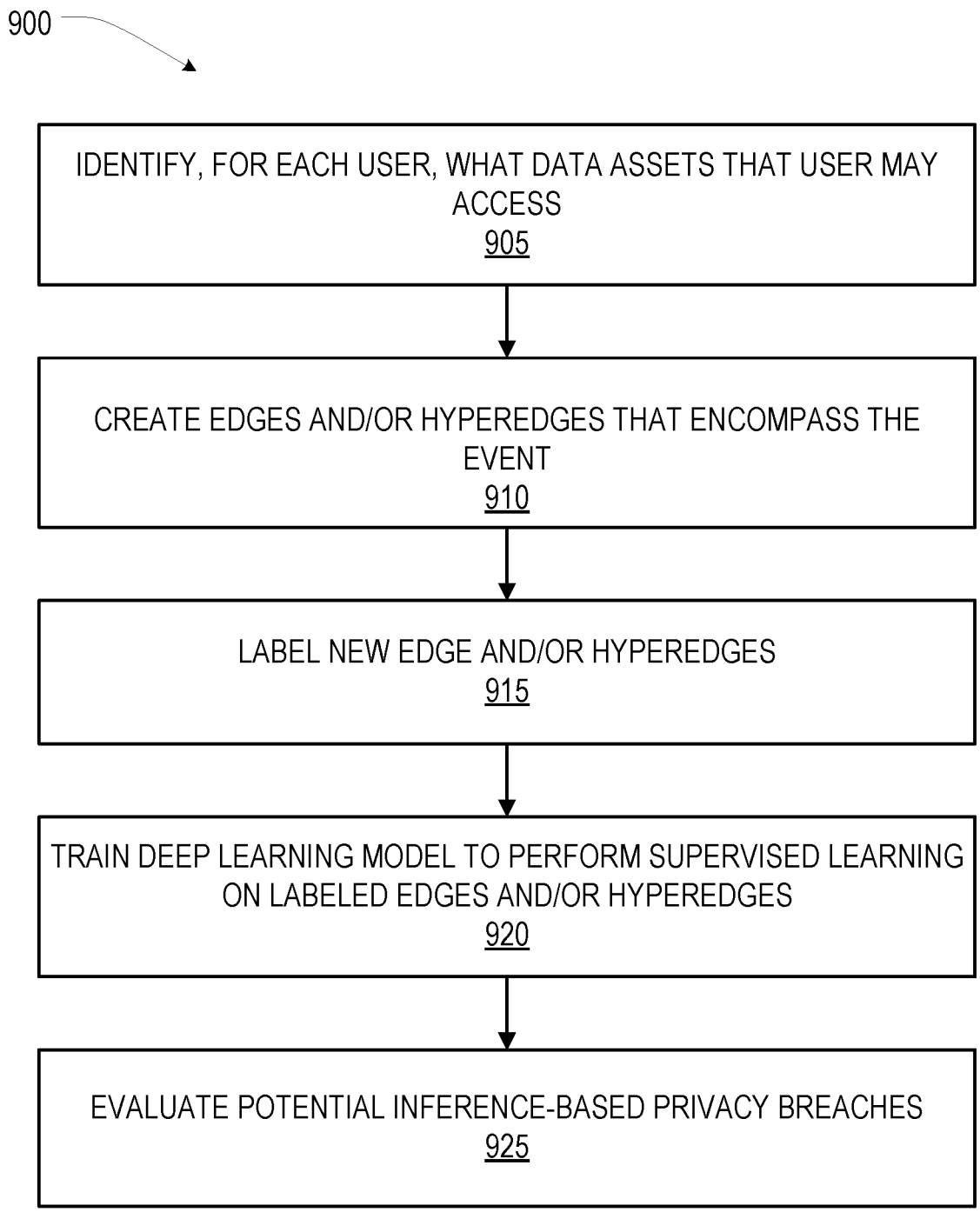
FIG. 9 is a flow chart illustrating a method of identifying potential privacy breaches that may result to inference vulnerabilities in a data ecosystem, consistent with some embodiments.

FIG. 9 is a flow chart illustrating one such method 900 of identifying potential privacy breaches that may result to inference vulnerabilities in a data ecosystem equipped with an enforcement graph and/or an enforcement hypergraph in a way that leverages topological movement and activity in the hypergraph over time, consistent with some embodiments. At operation 905, some embodiments may identify, for each user, what data assets that user may access. This may be defined using a rule-based system and/or computational edges or hyperedges. For computed edges, some embodiments may use edge inference from node embedding models, where the "event" may include some group of users accessing some group of data assets.

Next, for each event, edges and/or hyperedges may be created that encompasses the event at operation 910. The new edge and/or hyperedges may be labeled at operation 915 as "inference-vulnerable" or "not inference-vulnerable." A deep learning model (one such model being a "deep hyperedge") may then be trained at operation 920 to perform supervised training on these labeled edges and/or hyperedges. Next, at operation 925, potential inference-based privacy breaches may be evaluated by deploying and then running/using the trained ML model on future events, or hyperedges in the enforcement hypergraph. In some embodiments, the ML model may output a score related to the probability of an inference-based privacy breach given the input event(s).

One beneficial feature of some embodiments is the ability to generate inferences utilizing topological behaviors over time that exist with the nascency of hypergraph learning. In this way, the method 900 may be used to identify and analyze topological behavior, and may be used in conjunction with other existing access control decision systems, rule-based or otherwise.

User Behavior Analysis

Figure 10:
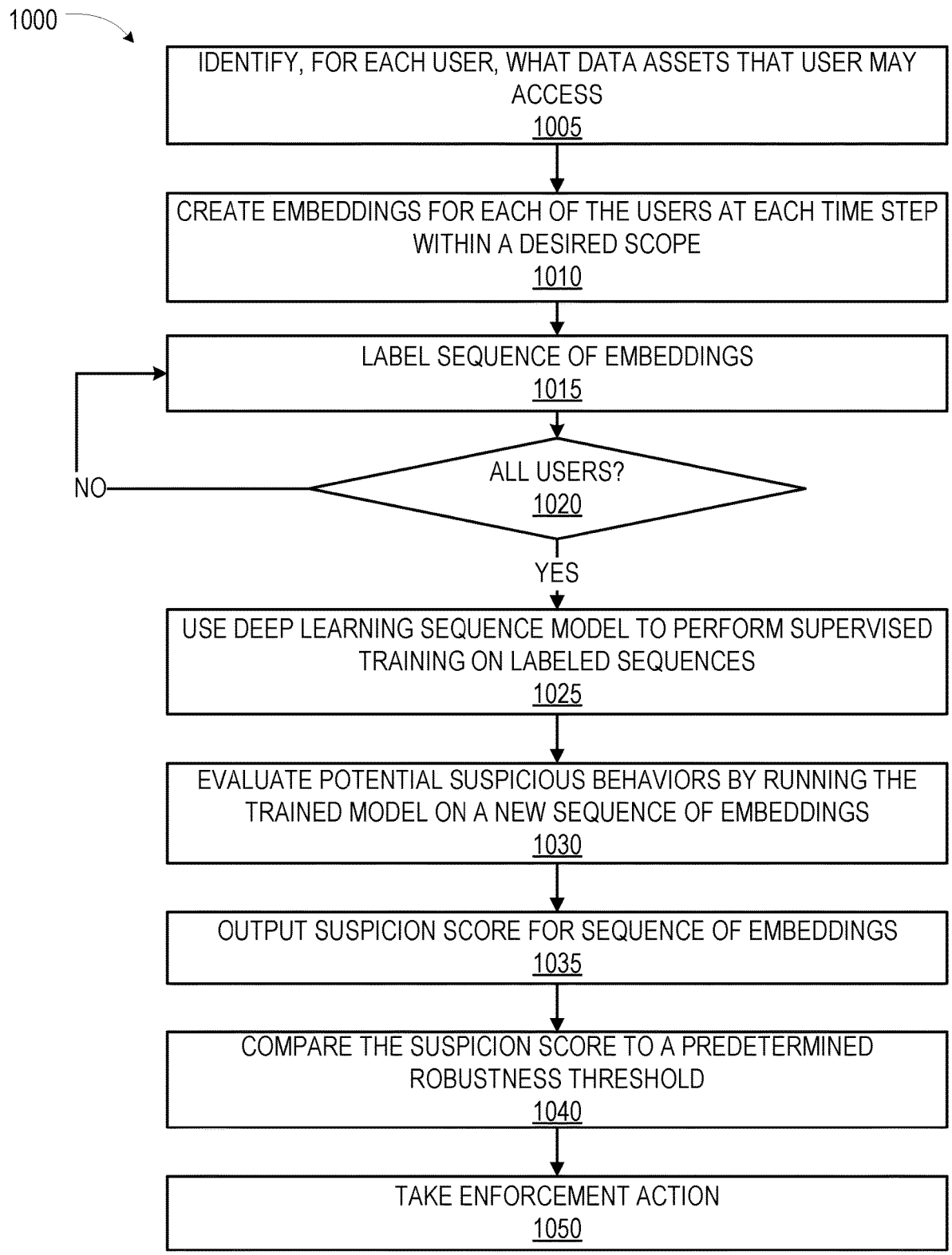
FIG. 10 is a flow chart illustrating one method of identifying anomalous or suspicious user behavior in a data ecosystem, consistent with some embodiments.

FIG. 10 is a flow chart illustrating one method 1000 of identifying anomalous or suspicious user behavior in a data ecosystem equipped with an enforcement graph and/or enforcement hypergraph policy engine, consistent with some embodiments. The method 1000 depicted in FIG. 10 may be desirable because it can leverage topological movement and activity in the graph and/or hypergraph over time.

At operation 1005, the data asset(s) that each user may access are identified. This may be defined by rule-based or computational edges or hyperedges in some embodiments. For computed edges, edge inference from node embedding models may be used, and the "event" may be some group of users accessing some group of data assets. Next, at operation 1010, embeddings for each of the users may be created at each time step within a desired scope.

The sequence of a user's embeddings (e.g., n embeddings for n time steps) may be labeled as "suspicious" or "not suspicious" at operations 1015, which may be repeated for each user at operation 1020. A trained, deep learning sequence model may then be used at operation 1025 to perform supervised training on these labeled sequences. Potential suspicious behaviors may be evaluated by running the trained model on a new sequence of embeddings (e.g., for a new user and/or a future set of timesteps) at operation 1030. A resulting suspicion score may be output at operation 1035, which may be related to a probability of the behavior being suspicious or illicit.

At operation 1040, the suspicion may be compared to a predetermined robustness criteria. The predetermined factor, in turn, may be selected by an administrator using a slider or other graphical user interface element. In response to the comparison, one or more of the queries in the sequence may be selectively blocked or transformed to prevent a data breach at operation 1050. Additionally or alternatively, the series of queries may be sent to an administrator.

This method 1000 may be desirable because it may be able to identify and analyzes topological behavior, as well as be used in conjunction with other existing access control decision systems, rule-based or otherwise.

Generative Adversarial Models (GANs)

Some embodiments may include graph-based generative adversarial models and/or hypergraph GANs to query a data ecosystem with an enforcement graph or/and hypergraph. In some embodiments, a user node under control of an adversarial user, optionally also having access to a predicted set of metadata, may be simulated by the generator portion of a GAN. In other embodiments, the generator portion of the GAN may, itself, issue the sequence of queries that attempt to attack/exploit the discriminator portion of the GAN. The discriminator portion of the GAN, in turn, may propose actions (e.g., policies) to defend against these kinds of attacks.

The generator may then be given a target. The generator may then create and issue generate a plurality of users and/or a series of queries to attain that target by making small adjustments to the parameters (e.g., the numbers, identities, and types of users under its control that request the different assets; the times at which the assets are requested, other metadata in the requests made by the user(s), etc.). These queries may repeat (e.g., yield the same null result) until a query or sequence of queries is approved by the system, resulting in a data breach.

The discriminator may complete with the generator in adversarial robustness training. Here, the discriminator ML model modifies its policies in response to a successful attack the generator to prevent that specific series of queries. In some embodiments, this may include using the successful event as an adversarial example as a training example in a "decision-maker" model for robustness. In this way, a new class of policies may be generated (i.e., adversarial inference policies) that may return a confidence score/risk score of a user that may be affected upon identifying adversarial behavior. Depending on the value of the score from the adversarial inference policies, the data ecosystem may selectively "deny" output in response to some or all of a series of input requests, may automatically notify an administrator about a possible attack, and/or may automatically perform transformations upon receipt of the queries to protect the underlying data.

Figure 11A:
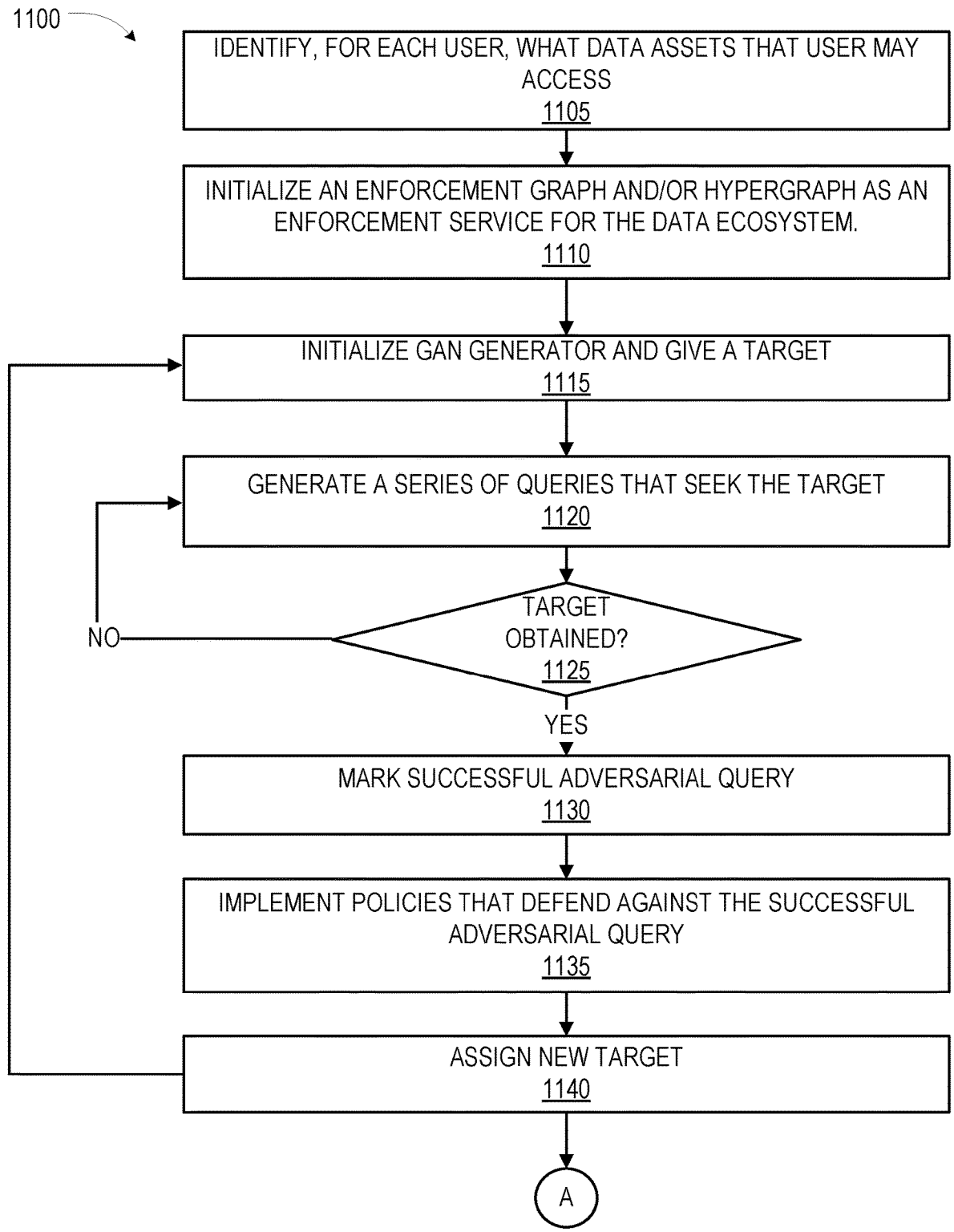
FIGS. 11A-B (collectively FIG. 11) are parts of a flow chart illustrating one method of using an enforcement graph or enforcement hypergraph to identify, and become robust against, queries that could lead to breaches, consistent with some embodiments.
Figure 11B:
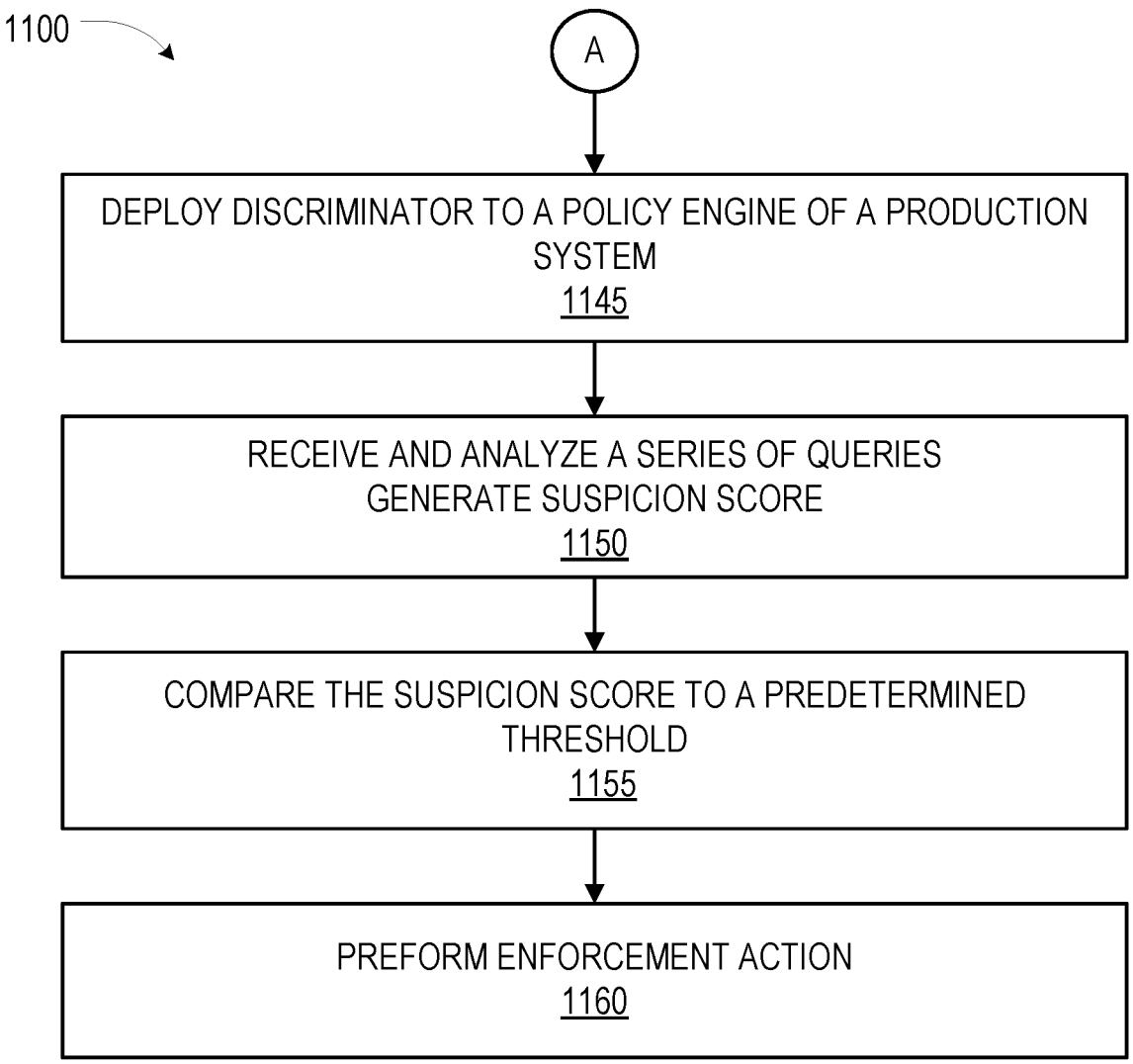

More specifically, FIGS. 11A-B (collectively FIG. 11) are parts of a flow chart illustrating one method 1100 of using an enforcement graph or enforcement hypergraph to identify, and become robust against, queries that could lead to breaches and/or that could result in inference vulnerabilities in a data ecosystem, consistent with some embodiments. The queries in FIG. 11 may be generated by a GAN generator to "look" harmless to the data ecosystem, but could result in breaches nonetheless when coupled with external data and/or metadata. In some embodiments, the GAN discriminator may act as a query discriminator protecting the data ecosystem.

In method 1100, the data assets each user may access may be identified at operation 1105 using, for example, a rule-based system, computational edges, or computational hyperedges. For the computed edges or hyperedges, edge inference from node embedding models may be used. At operation 1110, a GAN discriminator may begin by initializing an enforcement graph and/or hypergraph as an enforcement service for the data ecosystem.

Next, at operation 1115, the GAN generator may be initialized and given a target, e.g., to access "n" data assets using any number of simulated users and queries. Next, the generator may be configured to generate a series of queries that seek the target, adjusting the query parameters, to generate an adversarial query or sequence of adversarial queries at operation 1120. Operation 1120 may repeat until the target is obtained at operation 1125. In response, the causative query may be marked as a "successful adversarial query" at operation 1130.

Next, the discriminator may be instructed to implement policies that defend against the successful adversarial query at operation 1135. This may include training a deep learning-based "decision-maker" model on this example, if applicable. This method 1100 may be iterated continually to become increasingly more robust against adversarial queries.

Next, at operation 1135, the generator may be given a new target. Flow may then return to operation 1115. Operations 1115-1135 may be repeated for a predetermined number of cycles until a predetermined robustness metric is satisfied (e.g., robust against simulated attacks for a predetermined amount of time), etc.

After training of the discriminator is complete, the discriminator may be deployed to a policy engine of a production system at operation 1145. The policy engine may then begin to receive and analyze a series of queries using the trained discriminator and generate a suspicion score based on the analysis at operation 1150. At operation 1155, the suspicion score may be compared to a predetermined criterion. The predetermined criteria, in turn, may be selected by an administrator using a slider or other graphical user interface element. In response to the comparison, one or more of the queries in the sequence may be selectively blocked or transformed to prevent a data breach at operation 1160. Additionally or alternatively, the series of queries may be sent to an administrator.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A method for defending against adversarial queries, comprising:
   constructing a policy enforcement hypergraph to express a set of security policies;
   repeatedly traversing the hypergraph to determine whether a user behavior is changing over time, wherein the user behavior is measured by reference to a vertex or an edge in the hypergraph; and
   determining that the user behavior has changed over time based on the traversing of the hypergraph, wherein the determining includes using a sequence model for time series data of the user behavior, and, in response, taking an enforcement action based on a security policy.

2. The method of claim 1, wherein the hypergraph expresses:
   assets, users, and security policies as vertices and correlations; and
   contexts and events as edges.

3. The method of claim 2, wherein:
   the hypergraph comprises vertices and edges; and
   the method further comprises training a machine learning model to determine changes of the vertices and edges over time.

4. The method of claim 3, further comprising using the sequence model models for time series data to evaluate a behavior of the vertices and edges over time.

5. The method of claim 4, further comprising:
receiving a series of queries to a system;
analyzing the series of queries to identify changes of respective hypergraph vertices and edges over time;
in response to the analyzing, generating a suspicion score;
comparing the suspicion score to a predetermined robustness criteria; and
taking the enforcement action in response to the comparing.

6. The method of claim 5, further comprising receiving an adjustment to the robustness criteria.

7. The method of claim 1, wherein the enforcement action comprises revoking access privileges.

8. The method of claim 1, wherein the construction of the policy enforcement hypergraph utilizes a graph convolutional neural network.

9. The method of claim 1, wherein the construction of the policy enforcement hypergraph utilizes a hypergraph random walk model.

10. The method of claim 1, further comprising performing one-shot learning to embed vertices in graphs to estimate similarity between sets of vertices in the hypergraph.

11. The method of claim 1, wherein the hypergraph is repeatedly traversed by a long short-term memory (LSTM) model.

12. The method of claim 1, wherein:
the hypergraph comprises edges; and
the edges are used to define which policies apply which to users and assets in which contexts.

13. An adversarial query defense apparatus, comprising:
a memory; and
a processor that is configured to:
construct a policy enforcement hypergraph to express a set of security policies;
repeatedly traverse the hypergraph to determine whether a user behavior is changing over time, wherein the user behavior is measured by reference to a vertex or an edge in the hypergraph; and
determine that the user behavior has changed over time based on the traversing of the hypergraph, wherein the determining includes using a sequence model for time series data of the user behavior, and, in response, take an enforcement action based on a security policy.

14. The apparatus of claim 13, wherein the processor is further configured to:
use the hypergraph to express assets, users, and security policies as vertices and correlations, and contexts and events as edges, wherein the hypergraph comprises vertices and edges; and
train a machine learning model to determine changes of the vertices and edges over time.

15. The apparatus of claim 14, wherein the processor is further configured to:
use the sequence model to evaluate behaviour of the vertices and edges over time;
receive a series of queries to a system;
analyze the series of queries to identify changes of respective hypergraph vertices and edges over time;
in response to the analyzing, generate a suspicion score;
compare the suspicion score to a predetermined robustness criteria; and
take the enforcement action in response to the comparing.

16. The apparatus of claim 15, wherein the processor is further configured to receive an adjustment to the robustness criteria, wherein the enforcement action comprises revoking access privileges.

17. A computer program product for an adversarial query defense apparatus, the computer program product comprising:
one or more computer readable storage media, and program instructions collectively stored on the one or more computer readable storage media, the program instructions comprising program instructions to:
construct a policy enforcement hypergraph to express a set of security policies;
repeatedly traverse the hypergraph to determine whether a user behavior is changing over time, wherein the user behavior is measured by reference to a vertex or an edge in the hypergraph; and
determine that the user behavior has changed over time based on the traversing of the hypergraph, wherein the determining includes using a sequence models for time series data of the user behavior, and, in response, take an enforcement action based on a security policy.

18. The computer program product of claim 16, wherein the program instructions further configure the processor to utilize a graph convolutional neural network for the construction of the policy enforcement hypergraph.

19. The computer program product of claim 16, wherein the program instructions further configure the processor to utilize a hypergraph random walk model for the construction of the policy enforcement hypergraph.

20. The computer program product of claim 16, wherein the program instructions further configure the processor to repeatedly traverse the hypergraph by a long short-term memory (LSTM) model.

* * * * *